United States Patent Office 3,391,305
Patented July 2, 1968

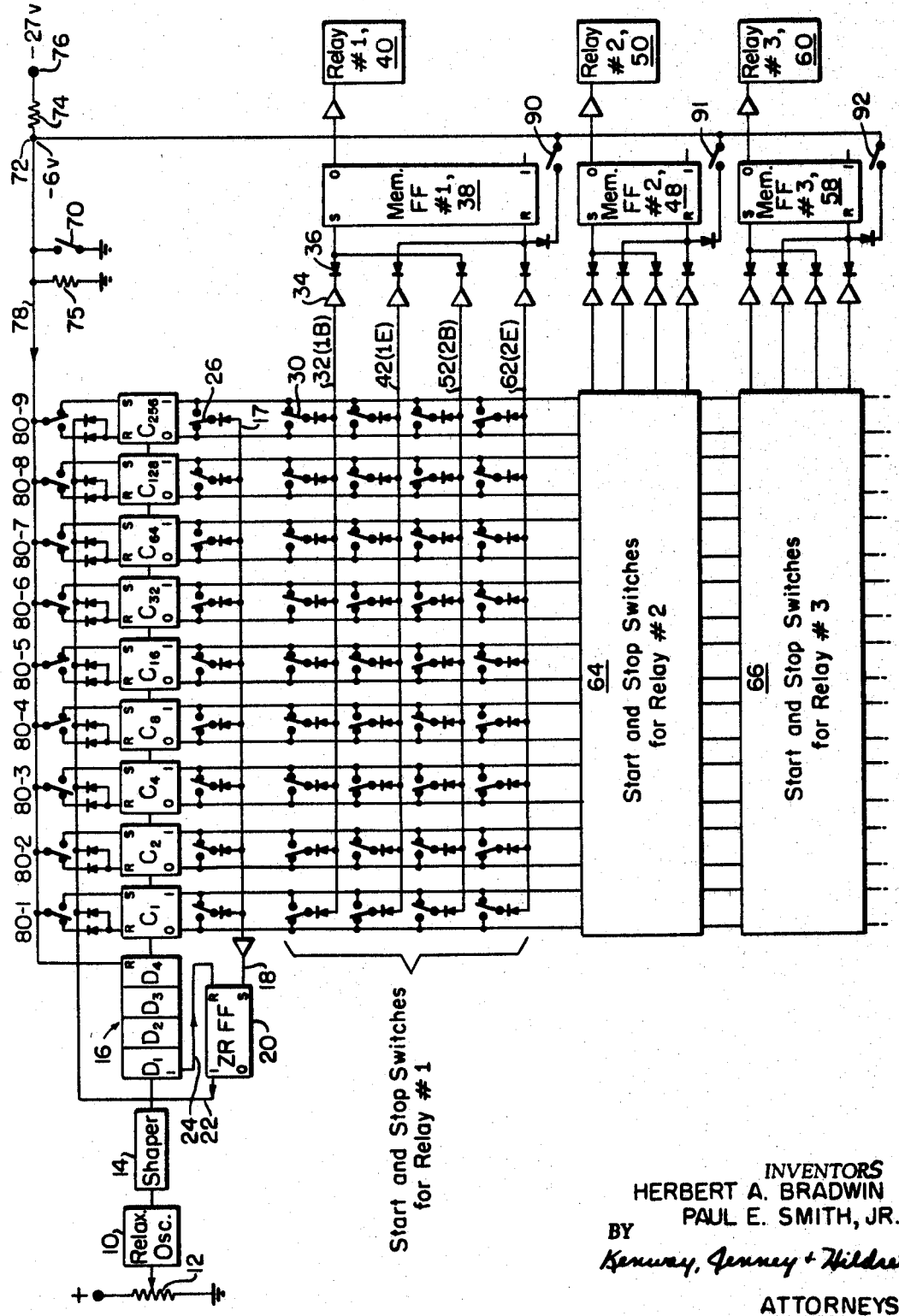

3,391,305
TIMER UNIT HAVING SELECTABLE REST POSITION
Herbert A. Bradwin, Avon, and Paul E. Smith, Jr., Littleton, Mass., assignors to The New York Air Brake Company, New York, N.Y., a corporation of New Jersey
Filed Apr. 28, 1965, Ser. No. 451,600
11 Claims. (Cl. 317—137)

This invention deals with the timing of the consecutive operations of industrial processes. Its principal object is to control the instants at which the various constituent operations of which such a process is composed occur with a high degree of accuracy and, at the same time, with wide flexibility of adjustment.

With the growing trend toward automation of industrial processes, there has arisen a need of timer apparatus of high precision and wide versatility. For one thing, the user sometimes wishes to modify the timing schedule of his process. For another, it is uneconomical for a supplier to provide each user with a special timer, custom-built to suit his particular needs.

The most familiar timer comprises a rotating shaft bearing a set of cams, each of which is percut to cause a cam follower to rise and to fall at preassigned instants of the rotation cycle of the shaft. Rise of a follower actuates a relay, and its fall releases it. The relay, when actuated, normally causes the start of an operation. When the relay is released, that operation comes to a halt. As many different cams are provided as there are relays to be controlled. With a cam-shaft timer of this sort, to advance or retard all the operations of a particular relay without altering the intervals between them requires an angular shift of the corresponding particular cam about the shaft. To alter any of the intervals between relay operations requires that the cam be replaced by another one having its high points and low points differently located. As a consequence, the timing of industrial operations as controlled by such a timer is rigid and invariable, and the timer must be differently constructed for each industrial use to which it is put.

These restrictions, and others, are overcome by the electronic timer of the invention. Its central building block is a counter constituted of a plurality of flip-flop stages connected in tandem, so that each stage fires on every other firing of the prior stage. To facilitate use by those familiar with rotating shaft timers, the counter is proportioned to count from zero to 359 and then return to zero; i.e., it is a "360-counter." Because the maximum protection from spurious influences is obtained with signals arranged in accordance with the binary number system, binary counting is employed. This requires nine stages. Without modification, a nine-stage binary counter counts from zero to 511. But in the present counter provision is made to reset it to zero on reaching a count of 360. Hence, each single-step advance of the counter corresponds exactly to a single degree of rotation of the shaft of the mechanical timer which the new timer replaces.

The two output terminals of each flip-flop stage are connected by way of a matrix of switches, to a plurality of output conductors. The switches of each output conductor are set by the operator, with the fullest latitude, to the count at which he wishes a particular event of his process to take place. For example, a first event may be the first actuation of a first relay, the second event may be its release, a third may be a second actuation of the same relay and a fourth may be its second release. Actuations and releases of one relay may be interleaved as desired with those of another relay. Evidently, the program may be varied widely, freely and readily to suit improvements and refinements that may have been developed in the industrial process subsequent to the installation of the timer.

An important feature of the new timer is that it may be caused to come abruptly to rest at an exactly specified count or, in terms of the process controlled, at an exactly specified point of the process. Moreover, merely by the operation of a "position set" switch, the new counter is caused to jump immediately to this prespecified condition. If desired, the several relays controlled by the timer may at the same time be deactivated, thus to leave the controlled process in a state of inactivity. Or, if preferred, those relays which happen to be in a state of activity when the preassigned count is reached may be allowed to remain active. This offers obvious advantages in the observation of a step of the process over a period far longer than normal, e.g. for checking and servicing the apparatus controlled; and this without in any way modifying the timing sequence currently in effect.

The invention will be fully apprehended from the following detailed description of a illustrative embodiment thereof, taken in connection with the appended drawing in which the single figure is a schematic circuit diagram showing the timer unit of the invention.

Referring now to the drawing, the central building block of the apparatus is a binary counter of nine flip-flop stages, designated C–1, C–2, C–4, etc. through C–256. Interstage couplings, by which each stage is driven by the prior one, are conventional, and are indicated by single lines. In its normal mode of operation, the counter is driven by a sequence of pulses applied to the input point of the first stage. Pulses of suitable character are deevloped by a relaxation oscillator 10 of which the pulse rate can be varied through an appropriate range, e.g. from 270 c.p.s. (cycles per second) to 900 c.p.s. by variation of an applied voltage derived from a potentiometer 12. The pulses are standardized in form by a shaper 14. They are then reduced in frequency, i.e., to a frequency in the range 27–90 c.p.s. by a ten-to-one divider 16. For reasons that will appear below, the divider 16 is advantageously constructed as a decade counter constituted of four binary flip-flop stages D–1, D–2, D–4, D–8 with auxiliary couplings, not shown, causing it to skip the last four of its sixteen possible counts, and return to zero on the tenth count. Inclusion of this divider makes for wide latitude in the proportioning of the relaxation oscillator 10 without regard to equating its natural frequency to that of the pulse train required for advancing the counter from each count to the next at a rate appropriate for the control of industrial processes.

In addition to the interstage count-advancing couplings, each counter stage is provided with two input terminals labelled "S" (set) and "R" (reset), respectively. It also has two output terminals, labelled "1" and "0." Each stage may adopt one or the other of two alternative conditions, OFF and ON. When the counter stage is OFF, a voltage of one magnitude appears at its "1" output point and a voltage of a different magnitude appears at its "0" output point. In a counter constructed to embody the invention the first named voltage is zero volts and the second one is minus six volts. When the counter is in the ON state, to which it may be driven either by a pulse from the preceding stage or by a pulse of appropriate magnitude and polarity applied to its "S" input point, these conditions are interchanged; i.e. the voltage of zero volts appears at its "0" output point, and the voltage at its "1" output point goes to minus six volts. The OFF state is restored either by the next pulse from the preceding stage or by application of a signal of appropriate magnitude and polarity to its "R" input point.

Without auxiliary interstage couplings, the nine-stage counter would count from 0 to 511. To facilitate programming by the user, a cycle of 360 counts is preferable.

For this reason, it is arranged that the counter return to zero on the 360th count. To this end the "0" output points of stages C–256, C–64, C–32 and C–8 and the "1" output points of the remaining stages are all connected by way of a conductor 17 to the input of an inverter whose output is connected to conductor 18. With these connections when, and only when, the count of 360 (256+64+32+8) is reached, the inverter is cut off, and the potential of conductor 18 falls abruptly to minus 6 volts. This signal is applied to the SET terminal of a flip-flop 20 designated "ZR" (zero reset). This unit then delivers from its "1" output point a signal which, applied by way of a conductor 22 and through diodes to the R input point of all its stages, operates to reset the entire nine-stage counter to zero. The ZR flip-flop 20 is thereupon immediately restored to its initial condition by application to its reset terminal of a pulse derived from the first stage D–1 of the decade counter 16 and delivered over a conductor 24. Since this stage changes its state ten times for each advance of the main counter, the resetting of the ZR flip-flop 20 takes place in a time corresponding to the advance of the simulated cam-shaft timer through one tenth of a degree of rotation.

In case the user may prefer to employ a cycle of a number of counts other than 360, the several counter stages are connected to the conductor 18 by way of switches; i.e. the switch 26 and eight others. To prevent undesired interstage couplings, a diode is connected in series with each switch.

Provided it is operating in the Repeat Cycle or RATE mode the nine-stage counter, once it has been reset to zero as described above, starts immediately to count again and, on reaching the end of its cycle, illustratively the count of 360, resets itself to zero, also as described above.

Below the reset conductor 18 are shown a bank of four groups of switches, each constituted of nine individual switches. Each switch of the first group, e.g., the switch 30, connects either the "1" output point of one counter stage or its "0" output point, through an isolating diode, to a conductor 32 labelled "1B," signifying "First Beginning." In the illustration, the switches of this group are thrown to positions such that the 1B conductor 32 receives a signal of zero volts at the count of 3 (2+1) and under no other condition. This signal is applied to an inverter 34 which is biased off whenever all of its inputs (on conductor 32) are zero. Inverter 34 output is connected through diode 36, to the SET terminal of a flip-flop 38 designated "Memory flip-flop #1." The output of this unit, thus turned ON, actuates the first of a plurality of relays, i.e., the relay 40; and this, in turn, starts one step of a process being controlled. Below the 1B conductor 32 a conductor 42 labelled "1E" similarly receives a signal of zero volts when the count of 45 (32+8+4+1) is reached. Conductor 42 controls an inverter whose output is applied to the reset terminal of Memory Flip-Flop #1, and so Relay #1 is deactivated at the count of 45. Through the agency of the third and fourth conductors 52, 62, labelled "2B" and "2E," the same relay 40 is again actuated at the count of 180 (128+32+16+4) and again deactivated at the count of 270 (256+8+4+2). Evidently, as many repeated operations of Relay #1 may be provided for as may be deemed necessary. The flexibility and versatility of the apparatus are sufficiently illustrated by two starts and two stops.

Below the bank of switches for controlling the first relay 40 similar banks of switches 64, 66 for similarly controlling other relays 50, 60 are indicated though, to avoid unnecessary complexity of the drawing, they are not shown in detail. The bank 64 is indicated as having four output conductors, of which the first and the third are connected to the SET input point of a flip-flop 48, designated "Memory Flip-Flop #2," thus to control two actuations of the second relay 50 at counts determined by the settings of the switches of this bank, while the second and the fourth are connected to the Reset input point of the flip-flop 48, thus again to deactivate the relay 50, also at counts determined by the settings of the switches. Similar connections are included in, and extend from, the third bank of switches 66, for controlling a third relay 60 through a third memory flip-flop 58. As many such banks of switches as may be deemed necessary may be included. If desired, some may have provision for more than two full operations of a selected relay. For many industrial purposes, two full operations of each of a plurality of relays in each full cycle of the timer are sufficient.

When the timer operates in the repeated cycle mode as described above, a mode selector switch 70 remains closed, thus to hold a point 72 at zero (ground) potential. The timer may, however, be operated in another mode, which may be termed the "Position Set" mode in which it jumps abruptly from any count at which it stands to a selected rest position and remains there as long as the Position Set Mode remains selected. To select the Position Set Mode, the mode selector switch 70 is opened, whereupon the point 72 falls to a potential of minus six volts, determined by the magnitudes of resistors 74, 75 and the potential of a source 76. This potential is applied, by way of a conductor 78, to one or the other of the two input points of all the stages of the timer counter. Application is by way of switches 80–1 through 80–9; and the senses in which the several switches 80 are thrown determines, for each counter stage, whether the minus six volt potential shall be applied to the S terminal of the stage or to its R terminal. In the cases of the R input points, buffer diodes are included to prevent interference between the position reset signal and the zero reset signal. They are omitted from the S input terminals because they are unnecessary.

In operation, the several switches are set to positions corresponding, in the binary number code, to the count at which it is desired that the counter come to rest. In the illustration, this count is 280 (256+16+8).

The positon set conductor 78 is extended, to the left in the drawing, to make connection with the Reset terminal of the last stage (D–8) of the decade counter-divider 16, thus to prevent it from firing and so to ensure that count-advancing pulses shall not be delivered from the divider 16 to the first stage C–1 of the nine-stage counter. Thus, opening of the mode selector switch 70 overcomes any state that the nine-stage counter may have adopted at the instant at which the switch 70 is opened, and it immediately adopts the state determined by the settings of the switches 80 without disturbance from incoming pulses of the count-advancing train; and because these settings are freely alterable at the will of the operator, the timer-counter may be caused to jump abruptly to any desired state or count, and remain there as long as the mode selector switch 70 remains open. The moment it is closed, the inhibiting signal is removed from the divider 16, count-advancing pulses are once more delivered by the divider 16 and counting, starting with the set position, illustratively 280, is immediately resumed. On reaching the count of 360, and in the absence of further refinements, the counter recycles itself, returning to the count of Zero, and counting one, two, three, etc., as described above.

In the Position Set Mode, it may be desired to deactivate all the relays 40, 50, 60, etc. that control the steps of the industrial process. This result is easily secured by closure of auxiliary switches 90, 91, 92 thus to apply the minus-six volt potential from the point 72 to the reset terminals of the memory flip-flops 38, 48, 58. A Position Set condition other than zero (360) in which the apparatus controlled is at rest, i.e., all relays are deactivated, is of value especially for the control of industrial processes having exceptionally long time constants. For example, because of the high inertia of the sources of mechanical power, an additional time is required in a rolling mill to start the apparatus, but only on the first occasion each day. So, too, with an industry such as the refining of oil or the dyeing of woven fabrics, a similar time is required, once each day, to bring the chemical reagents up to the proper temperatures. Once this has been done, repeated operations can take place without this additional period; i.e., the counter, having completed its count, may safely recycle itself to zero.

On the other hand, it may also be desired to leave a particular step or combination of steps of the process, initiated at some particular count, in progress for an extended period; e.g., to observe and check the correctness of operation of that step and, possibly, to repair or adjust associated apparatus. This result may be secured merely by opening an appropriate one or more of the auxiliary switches 90–92 in which case each of the memory flip-flops 38, 48, 58 remains in the state to which it was last advanced before opening of the mode selector switch 70.

The nine-stage counter shown provides a single count for each degree of rotation of the cam-shaft counter which it replaces. By addition of a single stage, which might be designated C–512, a count can be provided for each half degree; and each stage thus added doubles the precision with which the relays are controlled.

Various modifications, refinements and extensions of the embodiment shown will suggest themselves to those skilled in the art. For one example, by the substitution of an electronic mode selector switch for the manual switch shown, and by arranging e.g., with the aid of an auxiliary contact on a selected one of the relays, that it shall operate this electronic mode selector switch, the timer may be caused abruptly to adopt the Position Set mode of operation at the instant of activation of the selected relay. As another example, the Position Set Switches themselves may be of the electronic, in contrast to the manual, type. Then, with the aid of a register of well known construction, the rest position of the counter may be altered, from time to time, either in response to a program developed by an external source, or by the actuation of one of the relays actuated in the course of progress through the counting cycle.

Having now described our invention, we claim:

1. Apparatus for adjustably controlling the sequencing and timing of the actuations and deactivations of a two-condition load device in accordance with a readily adjustable program and, for each program, simulating the action of a mechanical cam-shaft timer which comprises a binary counter of N stages intercoupled in tandem and having set and reset input terminals and output terminals, said counter being proportioned to deliver from its several stages and in response to a train of input pulses applied to its first stage a sequence of $2^N$ different output voltage conditions, each consisting of N ON or OFF voltages representative of a particular count of the binary number system, the maximum count being a power of 2 in excess of $360m$ wherein $m$ is an integer other than zero, means for resetting said counter to its zero state on reaching a count of $360m$, a number $2n$ of output conductors, a load device, means responsive to different preassigned electrical conditions on the odd numbered ones of said conductors for actuating said load device $n$ times in a counting cycle, and means responsive to other different preassigned electrical conditions on the even numbered ones of said conductors for deactivating said device $n$ times in said counting cycle, the output terminals of all stages of said counter being interconnected with each of said output conductors through N switches, whereby the instants of actuation and of deactivation of said load device are determined by the settings of said switches and are precise to within $1/m$ degree of rotation of the shaft of the simulated timer.

2. In combination with apparatus as defined in claim 1, a plurality of additional load devices, like output conductors similarly arranged and connected to actuate and deactivate each of said additional load devices, and like switches interconnecting the output terminals of the several stages of the N-stage counter with the several output conductors feeding each of the additional load devices.

3. In apparatus as defined in claim 1, a memory flip-flop device having a set input point, a reset input point, and an output point, said device being proportioned to deliver, at its output point, an activating signal in response to a preassigned electrical condition applied to its set input point and a deactivating signal in response to the same electrical condition applied to its reset input point; said output point being connected to said load device, the odd numbered ones of said output conductors being connected to the set input point of said flip-flop device, and the even numbered ones of said output conductors being connected to its reset input point.

4. In combination with apparatus as defined in claim 1, a variable-frequency oscillator,
means for varying the frequency of the output of said oscillator through a desired range,
a decade counter of four stages for developing from said output,
a train of pulses having a repetition rate equal to one tenth of said frequency, and
connections for applying said pulse train to the driving point of the first stage of said N-stage counter.

5. Apparatus as defined in claim 1, having zero reset means, said zero-reset means including a flip-flop device having a set state and a reset state and being normally in its reset state, means responsive to a pulse representative of a count of $360m$ in the outputs of said N-stage counter for driving said flip-flop device to its set state, means responsive to the output of said flip-flop device in its set state for resetting all stages of said N-stage counter to zero, and means responsive to the next pulse from the first stage of said decade counter for resetting said flip-flop device to ready it immediately for accepting another setting pulse.

6. In combination with apparatus as defined in claim 1, a normally inactive Position Set conductor,
a plurality of switches for interconnecting one of the two input terminals of each stage of the N-stage counter with said conductor, the several permutations of said connections being thus representative of a selected one of $360m$ possible different counts, a mode control switch, and
means responsive to actuation of said mode control switch for applying an actuating voltage to said conductor, thereby to drive the several stages of said N-stage counter to conditions representative of said selected count.

7. In combination with apparatus as defined in claim 6, an oscillator, a four-stage decade counter for developing a train of count-advancing pulses from the oscillator output, and a connection extending from said Position Set conductor to the reset terminal of the last stage said decade counter, thereby, on actuation of said mode control switch to the Position Set position, to block application of driving pulses from said decade counter to said N-stage counter and so to inhibit advance of the counts of said N-stage counter.

8. Apparatus for adjustably controlling the sequencing and timing of the several steps of an industrial process in accordance with a readily adjustable program and, for each program, simulating the action of a mechanical cam-shaft timer which comprises a binary counter of nine stages intercoupled in tandem and having set and reset input terminals and output terminals, said counter being proportioned to deliver from its several stages and in response to a train of input pulses applied to its first stage, a sequence of 512 different output voltage conditions, each consisting of nine ON or OFF voltages arranged in accordance with the binary number system, means for resetting said counter to its zero state on reaching a count of 360, a number $2n$ of output conductors, a relay, means responsive to different preassigned electrical conditions on the odd numbered ones of said conductors for actuating said relay $n$ times in a counting cycle, means responsive to other different preassigned electrical conditions on the even numbered ones of said conductors for deactivating said relay $n$ times in said counting cycle, the output terminals of all stages of said counter being interconnected with each of said output conductors through switches, whereby the instants of actuation and of deactivation of said relay are determined by the settings of said switches and are precise to within one degree of rotation of the shaft of the simulated timer.

9. In combination with a binary counter of N intercoupled stages and proportioned to adopt, consecutively and in response to a train of count-advancing pulses, electrical conditions that are representative of the consecutive numbers $0, 1, 2, 3 \ldots 2^{N-1}$, accessible output conductors on which said electrical conditions are available for utilization, means for preselecting a particular one of said numbers, means for causing said counter abruptly to adopt the electrical condition represented by said preselected number, and means causing the preselection range of said number to be coterminous with the range of said consecutive numbers.

10. Apparatus as defined in claim 9 wherein each stage of said counter is provided with two differently-effective input terminals, and wherein said adoption-causing means comprises means for applying a control potential to a selected one of the two input terminals of each stage of said counter, the several selections being arranged in accordance with the binary number system.

11. In apparatus as defined in claim 10, a source of a control potential, a position set conductor, switch means for energizing said conductor with said potential, N single pole-double throw switches, each having a common terminal and two poles that are alternatively connectible to said common terminal, said common terminal being connected to said position set conductor, said 2N poles being connected, respectively, to the 2N input terminals of said N stages;

whereby said preselected number is readily altered throughout a range of $2^N$ different values by the arranged actuation of said N switches.

No references cited.

MILTON O. HIRSHFIELD, *Primary Examiner.*

J. A. SILVERMAN, *Assistant Examiner.*

UNITED STATES PATENT OFFICE
CERTIFICATE OF CORRECTION

Patent No. 3,391,305

July 2, 1968

Herbert A. Bradwin et al.

It is certified that error appears in the above identified patent and that said Letters Patent are hereby corrected as shown below:

In the heading to the printed specification, lines 5 and 6, "assignors to The New York Air Brake Company, New York, N. Y., a corporation of New Jersey" should read -- assignors to General Signal Corporation, a corporation of New York --.

Signed and sealed this 23rd day of December 1969.

(SEAL)
Attest:

Edward M. Fletcher, Jr.
Attesting Officer

WILLIAM E. SCHUYLER, JR.
Commissioner of Patents